United States Patent [19]

Iida

[11] Patent Number: 5,056,421
[45] Date of Patent: Oct. 15, 1991

[54] AUTOMOBILE AIR-CONDITIONER

[75] Inventor: Katsumi Iida, Konan, Japan

[73] Assignee: Zexek Corporation, Tokyo, Japan

[21] Appl. No.: 593,024

[22] Filed: Oct. 3, 1990

[51] Int. Cl.⁵ .............................................. B60H 1/00
[52] U.S. Cl. .................................... 98/2.01; 98/40.24; 236/91 C
[58] Field of Search ................... 98/2.01, 40.24, 40.26; 165/43, 49.3; 236/91 C

[56] References Cited

U.S. PATENT DOCUMENTS 4,760,772  8/1988  Horiguchi et al. ................... 98/2.01
4,890,460  1/1990  Takasi et al. ..................... 126/425 Y

FOREIGN PATENT DOCUMENTS 0017559  1/1987  Japan ................................... 98/40.24

Primary Examiner—William E. Wayner
Attorney, Agent, or Firm—Wenderoth, Lind & Ponack

[57] ABSTRACT

An automobile air-conditioner wherein a direction of the sunlight coming into the passanger compartment of an automobile is detected, and if a deviated solar radiation is present, air-distribution is controlled to increase and decrease the quantity of air discharged from upper air outlets according to the detected solar radiating direction, while at the same time, louvers disposed in the respective air outlets are directed to an occupant to force conditioned air directly against the occupant. In the absence of the deviated solar radiation, the louvers are not directed to the occupant.

5 Claims, 6 Drawing Sheets

AUTOMOBILE AIR-CONDITIONER

BACKGROUND OF THE INVENTION

1. Field of the Invention

The present invention relates to an automobile air-conditioner capable of controlling the discharge direction of conditioned air according to the direction of solar radiation.

2. Description of the Prior Art

There have been proposed various automobile air-conditioners of the type in which proportions of air to be distributed to the left side of the passenger compartment and air to be distributed to the right side of the passenger compartment are changed depending upon solar radiation amounts at the left and right sides of the passenger compartment for keeping the passenger compartment in a proper air-conditioned state. Japanese Patent Publication No. 58-50884, for example, discloses a control system comprising a solar radiation quantity detecting means for detecting proportions of solar radiation amounts at various portions of the passenger compartment, and a setting means for setting a balance of air conditioning between the respective portions of the passenger compartment, wherein the balance of air conditioning between the portions of the passenger compartment is controlled according to the detected solar radiation amounts and the set air-conditioning balance.

With this disclosed system, the temperature of the respective portions is controlled depending upon the balance of air conditioning between the same portions. The air-conditioning balance controlling system is, however, not satisfactory for the reasons described below. The occupant's feelings toward the effect of air-conditioning is influenced mostly by streams of conditioned air blowing upon the body of the occupant. When the louver is directed in an improper direction, for instance, when the louver is directed leftward even when the sunlight coming into the passenger compartment from the right of the automobile body, conditioned air which is distributed in a greater amount to the right side than to the left side of the passenger compartment is deflected leftward by the louver. Thus, an intended balance of air-conditioning is difficult to obtain.

SUMMARY OF THE INVENTION

With the foregoing difficulties in view, it is an object of the present invention to provide an automobile air-conditioner which is capable of setting air-outlet louvers in a proper direction to conform to an air conditioning balance controlled based on solar radiation quantities at various portions of the passenger compartment, thereby effecting the control of air conditioning balance sufficiently.

According to the present invention, there is provided an air-conditioner for an automobile, comprising: a solar radiation quantity detecting means for detecting a quantity of solar radiation at the right side of a passenger compartment of the automobile and a quantity of solar radiation at the left side of the passenger compartment; a solar radiating direction calculating means for calculating a solar radiating direction based on solar radiation quantity signals detected by the solar radiation quantity detecting means; an air-distribution control means for determining proportions of air to be distributed to the left side of the passenger compartment and air to be distributed to the right side of the passenger compartment according to the solar radiating direction calculated by the solar radiating direction calculating means; an air-distribution door operable under the control of the proportions of air determined by the air-distribution control means; a plurality of louvers disposed, respectively, at a plurality of upper air outlets facing to the passenger compartment, the louvers being capable of swinging to set the direction air discharged from the respective upper air outlets; a louver control means for controlling the direction of louvers according to the proportions of air determined by the air-distribution control means.

With this construction, from the left side solar radiation quantity and the right side solar radiation quantity which are detected by the solar radiation quantity detecting means, a solar radiating direction is calculated by the solar radiating direction calculating means. From the solar radiating direction, a left-to-right air-distribution ratio is calculated by the air-distribution control means and used to move the air-distribution door. At the same time, based on the left-to-right air-distribution ration, the louver control means controls the louvers to move between a front direction and an occupant direction.

More specifically, when the air-distribution door is tilted in either direction to increase the air distribution on one side relative to that of the opposite side, the louvers are directed to an occupant of the automobile for forcing conditioned air directly against the occupant, thus giving an improved feeling of air-conditioning to the occupant in case of the deviated solar radiation. If the deviated solar radiation does not take place, the louvers are disposed straight so as not to force conditioned air directly against the occupant. Thus, the occupant does not feel the passenger compartment too cool and hence is kept comfortable due to a properly controlled left-to-right air-distribution ratio.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in greater detail with reference to a certain preferred embodiment shown in the accompanying drawings.

Figure 1:
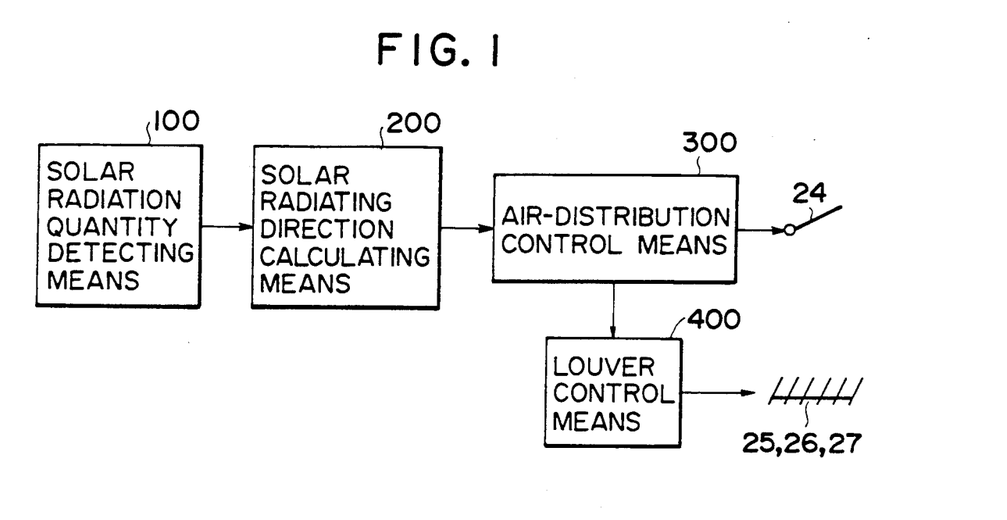
FIG. 1 is a block diagram showing the functional construction of the present invention.

As shown in FIG. 1, an automobile air-conditioner according to the present invention generally comprises solar radiation quantity detecting means 100 for detecting a quantity of solar radiation at the right side of a passenger compartment of the automobile and a quantity of solar radiation at the left side of the passenger compartment, a solar radiating direction calculating means 200 for calculating a solar radiating direction based on solar radiation quantity signals detected by the solar radiation quantity detecting means 100, an air-distribution control means 300 for determining proportions of air to be distributed to the left side of the passenger compartment and air to be distributed to the right side of the passenger compartment according to the solar radiating direction calculated by the solar radiating direction calculating means 200, an air-distribution door 24 operable under the control of the proportions of air determined by the air-distribution control means 300, a plurality of louvers 25, 26, and 27 disposed, respectively, at a plurality of upper air outlets facing to the passenger compartment, the louvers 25-27 being capable of swinging to set the direction air discharged from the respective upper air outlets, and a louver control means 400 for controlling the direction of louvers 25-27 according to the proportions of air determined by the air-distribution control means 300.

Figure 2:
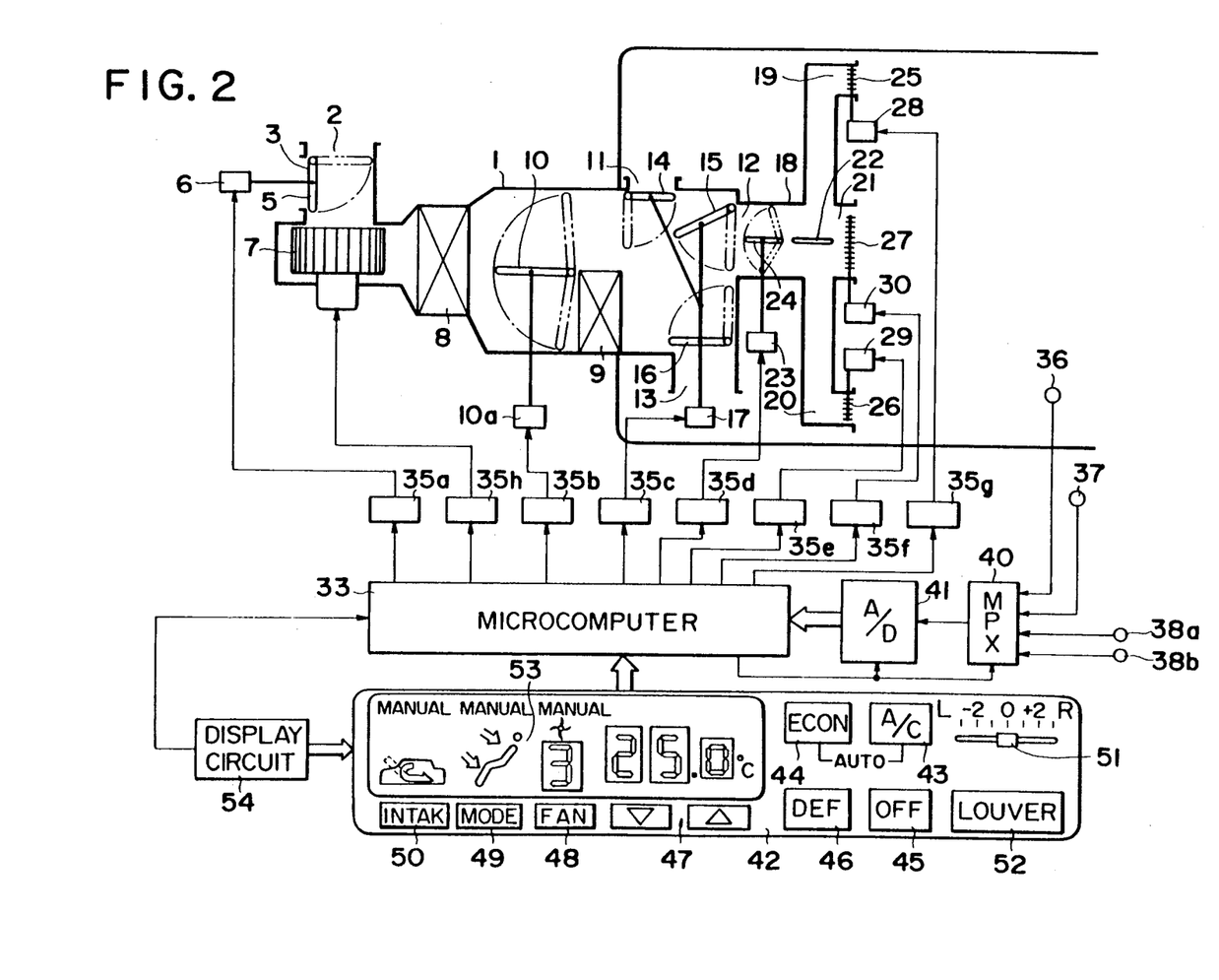
FIG. 2 is a diagrammatical view showing an automobile air-conditioner according to the present invention.

FIG. 2 diagrammatically shows an automobile air-conditioner. The air-conditioner includes an air-flow duct 1 having an outside air inlet 2 and a recirculating air inlet 3 disposed at an upstream end thereof in bifurcated fashion. A selector door 5 is disposed at the junction between the two air inlets 2, 3 and is actuated by an actuator 6 to select the recirculated air or the outside air to be introduce into the air-flow duct 1, so that a desired intake mode is obtained.

A blower 7 is disposed in the air-flow duct 1 adjacent to the air inlets 2 and 3 for forcing the air to flow downstream through the air-flow duct 1. The duct 1 also includes an evaporator 8 disposed downstream of the blower 7. The evaporator 8 is connected by piping with a compressor, a condenser, a receiver tank and an extension valve (none of them being shown) to jointly constitute a refrigeration system or cycle.

A heater core 9 is disposed downstream of the evaporator 8, and an air-mix door 10 is disposed upstream of the heater core 9. The angular position of the air-mix door 10, that is, the opening of the air-mix door 10 is regulated by an actuator 10a so that proportions of air flowing through the heater core 9 and air by passing the heater core 9 are changed to thereby control the temperature of air to be discharged from the air-conditioner.

The air-flow duct 1 has at its downstream end a defroster outlet 11, an upper connecting outlet 12 and a lower outlet 13 what are provided in branched fashion and all open to a passenger compartment 31. Three mode doors 14, 15, and 16 are disposed adjacent to the respective outlets 11, 12, and 13. The move doors 14-16 are controlled by an actuator 17 to provide a desired discharge mode. The downstream end the upper connecting outlet 12 is connected to an upper discharge duct 18. The discharge duct 18 has at its downstream end a right upper air outlet 19 opening to the right side of the passenger compartment 31, a left upper air outlet 20 opening to the left side of the passenger compartment 31, and a central upper air outlet 21 disposed centrally between the right and left upper air outlets 19, 20. A partition plate 22 is disposed at the junction between these air outlets 19-21, and an air-distribution door 24 is disposed in front of the partition plate 22. The air-distribution door 24 is controlled by an actuator 23 to adjust proportions of air to be distributed to the left side of the passenger compartment 31 and air to be distributed to the right side of the passenger compartment 31.

The right, left and central upper air outlets 19, 20, and 21 are provided with louvers 25, 26, and 27 of a known construction. The louvers 25-27 are driven by actuators 28, 29, and 30, respectively, to control the direction of air discharged from the corresponding outlets 29-21. The actuators 6, 10a, 17, 23, 28, 29, and 30 and a motor of the blower 7 are controlled by output signals supplied from drive circuits 35a-35h which convert command signals from a microcomputer 33 into the control signals.

The microcomputer 33 is of the construction known per se and includes a central processing unit (CPU), a read only memory (ROM), a random access memory (RAM), an input/output port (I/O), etc. Based on various input signals described below, the microcomputer 33 performs control programs stored therein to control operation of the selector door 5, blower 7, air-mix door 10, mode doors 14, 15, and 16, air-distribution door 24, and louvers 25, 26, and 27.

Element 36 is a passenger compartment temperature sensor for detecting the temperature Tr in the passenger compartment element 37 is an outside air temperature sensor for detecting the temperature Ta of the outside air, and elements 38a and 38b are left and right solar radiation sensors for detecting a quantity $S_{L1}$ of solar radiation at the left side of the passenger compartment 31 and a quantity $S_{R1}$ of solar radiation at the right side of the passenger compartment 31, respectively. Output signals from the respective sensors 36 -38b are inputted through a multiplexer 40 into an analog-to-digital (A/D) converter 41 in the order selected by the multiplexer 40. The A/D converter 41 digitizes the input signals and then send then into a microcomputer 33.

Figure 8:
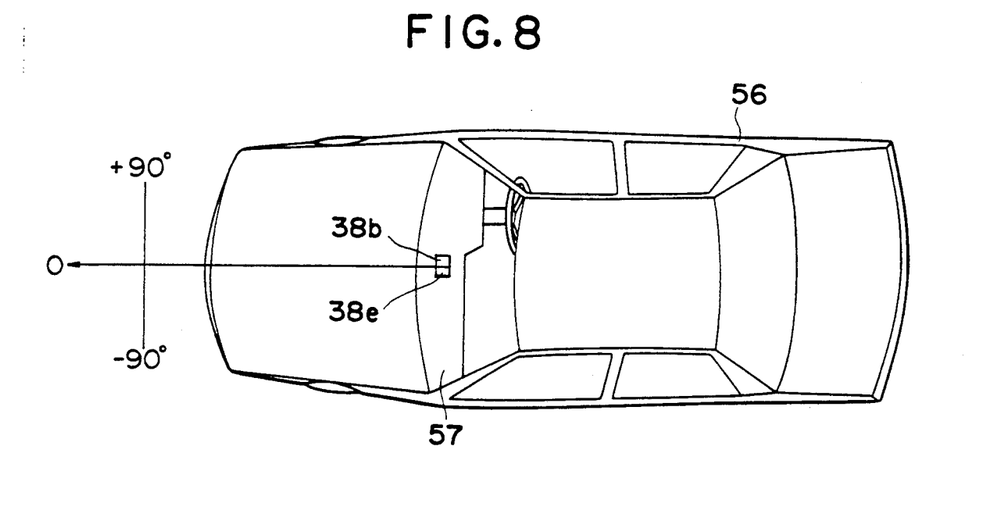
FIG. 8 is a schematic plan view showing a solar radiation sensor disposed on an automobile.
Figure 9:
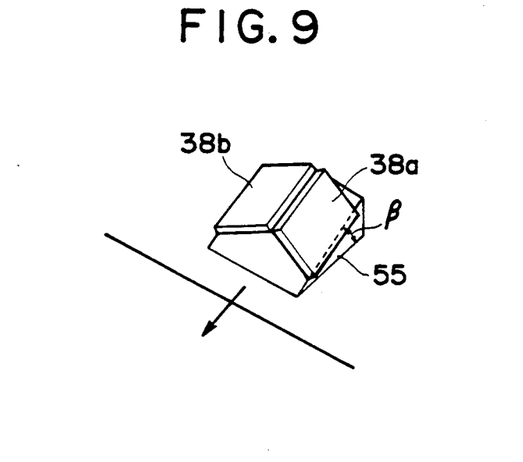
FIG. 9 is an enlarged perspective view of the solar radiation sensor.

The left and right solar radiation sensors 38a and 38b, as shown in FIGS. 8 and 9, are composed of left and right light-receiving elements secured, respectively, to opposite sloped side surfaces of a triangular roof-like sensor base 55, the side surfaces facing to the left and right of an automobile 56. The sensor base 55 is disposed obliquely on an upper surface (horizontal surface) of an instrument panel 57 at an angle of $\beta$ with the right and left solar radiation sensors 38a and 38b facing laterally outwardly to the left and right sides of the automobile 56. The left and right light-receiving elements generally comprise photodiodes which convert a solar radiation quantity to an electrical current.

The microcomputer 33 also receives various signals from a console panel 42, as described later on. The console panel 42 is equipped with an air-compressor (A/C) switch 43 for activating the compressor in the refrigeration cycle, an economy (ECON) switch 44 for driving the compressor in the economy mode (the switches 43 and 44 also serve as automatic control mode switches), an off (OFF) switch 45 for stopping the operation of the air-conditioner, a defroster (DEF) switch 46 for setting the discharge mode to the defroster mode, a temperature setter 47 for setting the temperature in the passenger compartment, a blower capacity setter 48 for setting the capacity of the blower 7, a mode setter 49 for setting discharge modes other than the defrost mode, an intake mode setter 50 for setting the intake mode an air-distribution control lever 51 for manually adjusting the right-to-left air distribution, and a louver switch 52 for controlling the louvers 25-27. All the switches, setters and control lever sent output signals to the microcomputer 33. The console panel 42 includes a display unit 53 which is driven by a display circuit 54 for indicating a temperature, a blower capacity, a discharge mode, an intake mode that are selected by the setters 47-50.

Figure 3:
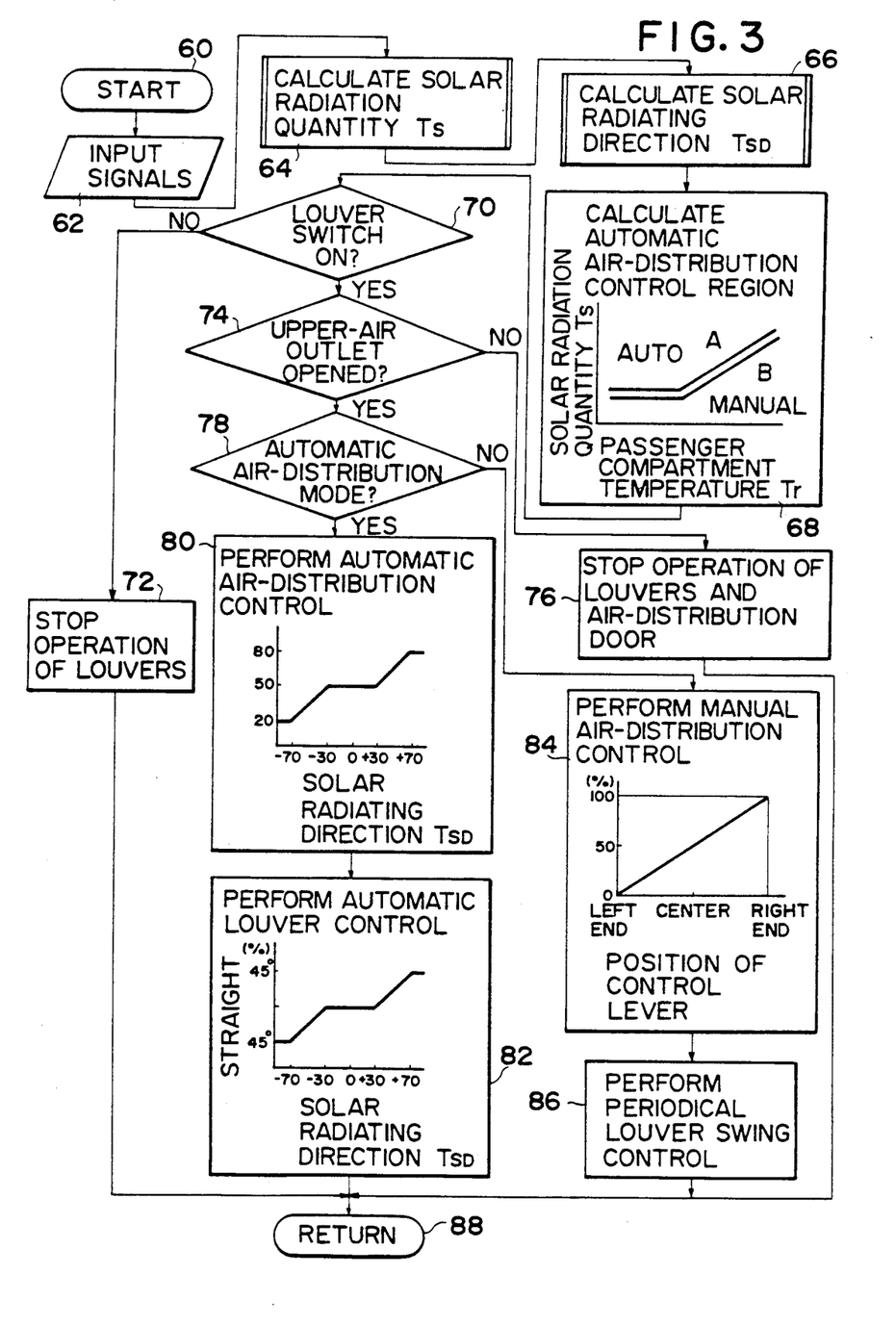
FIG. 3 is a flowchart showing a control routine for the control of air-distribution and the control of operation of louvers.

Operation of the microcomputer 33 will be described below with reference to a flowchart shown in FIG. 3. The flowchart illustrates a routine achieved for controlling the direction of louvers according to the direction of solar radiation. A step 60 starts the control routine of the microcomputer 33 and in the next following step 62, detected values $T_{SL}$, $T_{SR}$ from the left and right solar radiation sensors 38a and 38b, a detected value Tr from the passenger compartment temperature sensor 36, output signals from the air-distribution control lever 51 and louver switch 52, and a discharge mode signal are inputted to the microcomputer 33.

After the data input process in the step 62, a step 64 calculate a solar radiation quantity $T_S$ based on the output signals $T_{SL}$, $T_{SR}$ of the respective solar radiation signals 38a, 38b. The solar radiation quantity calculation step 62 is achieved in accordance with a subroutine illustrated in FIG. 4. A step 90 obtains an interpolated value $(T_{SR}+T_{SL})/K_2$ as indicated by dotted lines in FIG. 5, based on the output signal $T_{SL}$ from the left solar radiation sensor 38a and the output signal $T_{SR}$ from the right solar radiation sensor 38b. The interpolated value is a control value $T_S$. The interpolated value is needed because the respective solar radiation sensors 38a and 38b have different directivities as indicated by solid lines in FIG. 5 and hence outputs from the respective solar radiation sensors 38a and 38b must be compensated to obtain a constant output irrespective of the direction of solar radiation. The above-mentioned $K_2$ is a calculation determined such that the interpolated value has a peak which is equal to the peaks of the output signals $T_{SL}$, $T_{SR}$. In the succeeding steps, the control value $T_S$ is replaced by a largest one of the three values $T_{SL}$, $(T_{SR}+T_{SL})/K_2$ and $T_{SR}$ (steps 92 to 100).

Figure 6:
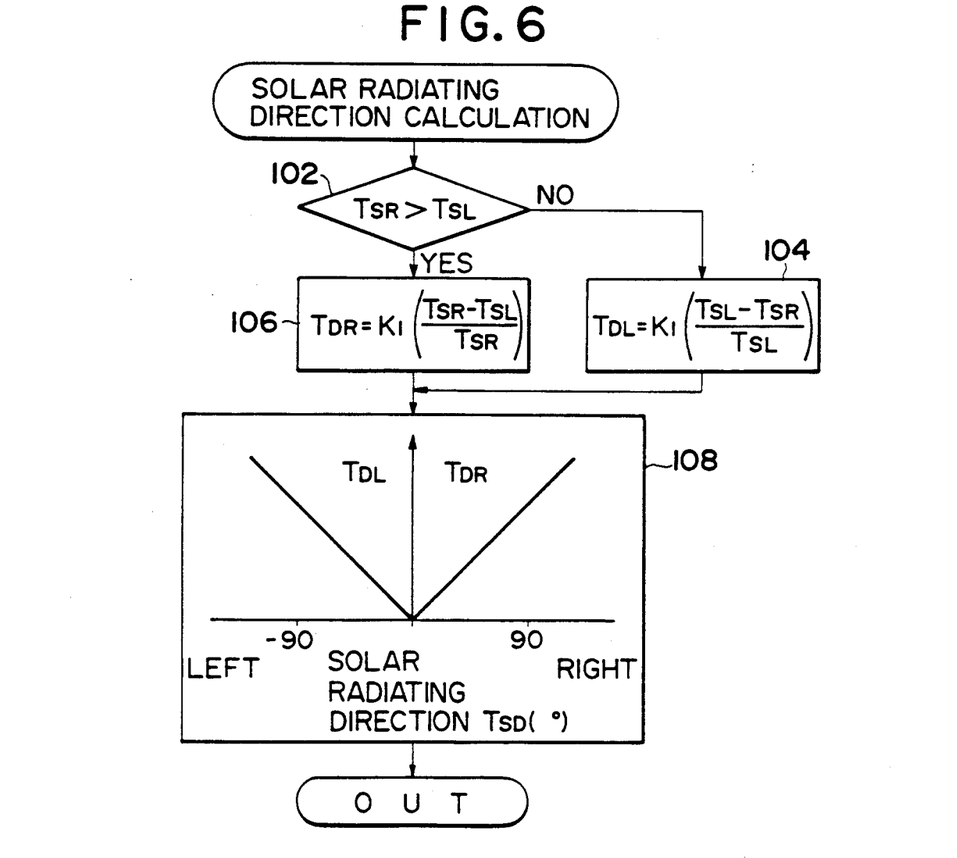
FIG. 6 is a flowchart showing a control subroutine for the calculation of a solar radiating direction.

After the calculation of the solar radiation quantity, a step 66 calculates a solar radiating direction. This calculation is performed in accordance with a subroutine as illustrated in FIG. 6. A step 102 compares the magnitude of the output signal $T_{SL}$ from the left solar radiation sensor 38a with the output signal $T_{SR}$ of the right solar radiation sensor 38b. If $T_{SL}>T_{SR}$, the control goes on to a step 104 to obtain a left deviation coefficient $T_{SL}$ in accordance with the following expression (1). Conversely, if $T_{SR}>T_{SL}$, the control advances to a step 106 to obtain a right deviation coefficient $T_{SR}$ in accordance with the following expression (2).

$$T_{DL} = K_1 \left( \frac{T_{SL} - T_{SR}}{T_{SL}} \right) \quad (1)$$

$$T_{DR} = K_1 \left( \frac{T_{SR} - T_{SL}}{T_{SR}} \right) \quad (2)$$

where $K_1$ is a calculation constant.

A step 108 a solar radiating direction $T_{SD}$ is obtained from the deviation coefficient $T_{DL}$ obtained in the step 104 or the deviation coefficient $T_{DR}$.

Figure 4:
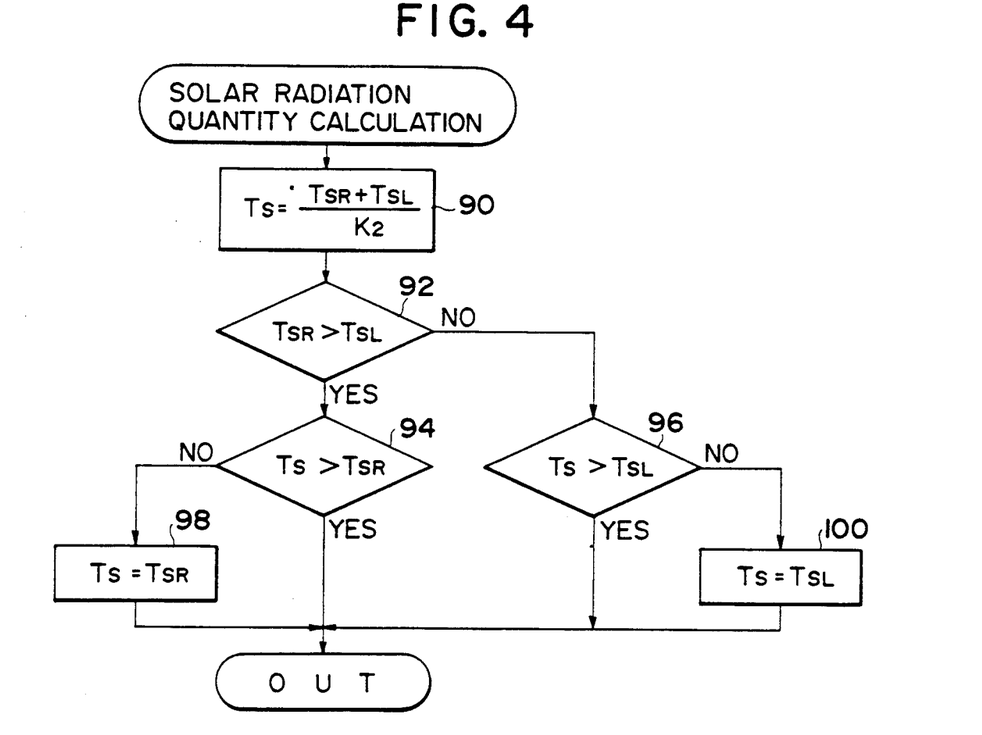
FIG. 4 is a flowchart showing a control subroutine for the calculation of a solar radiation quantity.
Figure 5:
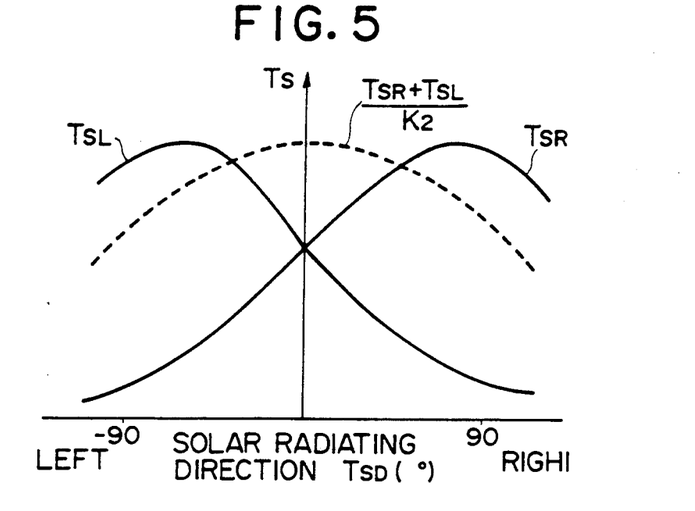
FIG. 5 is a graph explanatory of the calculating operation of the subroutine.

Subsequently, the control advances to a step 68 to make a calculation based on the solar radiation quantity $T_S$ and the passenger compartment temperature Tr so as to determine as to whether the left and right air-distribution control in the passenger compartment is achieved in the automatic mode or in the manual mode. As shown in FIG. 4, when the solar radiation quantity $T_S$ is relatively large and the passenger compartment temperature Tr is low (in a region A), the automatic control mode is employed. Conversely, when the solar radiation quantity $T_S$ is relatively small and the passenger compartment temperature Tr is high (in the region B), the manual control mode is employed.

Thereafter, the control advances to a step 70 to judge whether the louver switch 52 is depressed or turned on. If yes, the control further advances to a step 74. If no, the control goes on to a step 72 to stop operation of the louvers 25-27.

The step 74 determines whether or not the upper connecting outlet 12 is opened (namely, whether the discharge mode is a vent mode or a bi-level mode). If yes, this means that the upper connecting outlet 12 is open. Then the control advances successively to steps 78, 80, 82, 84 and 86 to perform the air-distribution control and the louver control. If no, this means that the upper connecting outlet 12 is closed. In this case, the air-distribution control and the louver control are unnecessary and hence the control goes on to a step 76 to stop operation of the louvers 25-27 and the air-distribution door 24.

The step 78 determined whether or not the air-distribution control is in the automatic mode, if yes, the control advances to the step 80 to perform the automatic air-distribution control. If no, the control goes on to the step 84 to perform the manual air-distribution control.

The step 80 determines the left-to-right air-distribution ratio, that is proportions or air to be distributed to the left side and air to be distributed to the right side based on the solar radiating direction $T_{SD}$. For instance, when the solar radiating direction is in the range of $-30°-+30°$, the left-to-right air-distribution ratio is 1:1. As the deviation of solar radiating direction increases from $-30°$ to $-70°$ (in the range of deviated solar radiating direction), the air-distribution to the left side of the passenger compartment increases progressively. When the deviation of solar radiating direction exceeds $-70°$, the left-to-right air-distribution ratio is 5:1. Conversely, the air-distribution to the right of the passenger compartment increases progressively as the deviation of solar radiating direction increases from $+30°$ to $+70°$ (in the range of deviated solar radiating direction). When the deviation of solar radiating direction exceeds $+70°$, the left-to-right air-distribution ratio is 1:5.

After the air-distribution is determined, the control advances to the step 82 to perform the louver control in the automatic mode. In the step 82, when the solar radiating direction is in the range of from $-30°$ to $+30°$, the louvers 25, 26, 27 are directed straight (an angle of inclination of the louvers is 0°). After the solar radiating direction $T_{SD}$ exceeds an angle of $-30°$ or $+30°$, the louvers are tilted gradually. When the radiating direction is equal to $-70°$ or $+70°$, the louvers are tilted at an angle of 45°.

Figure 7:
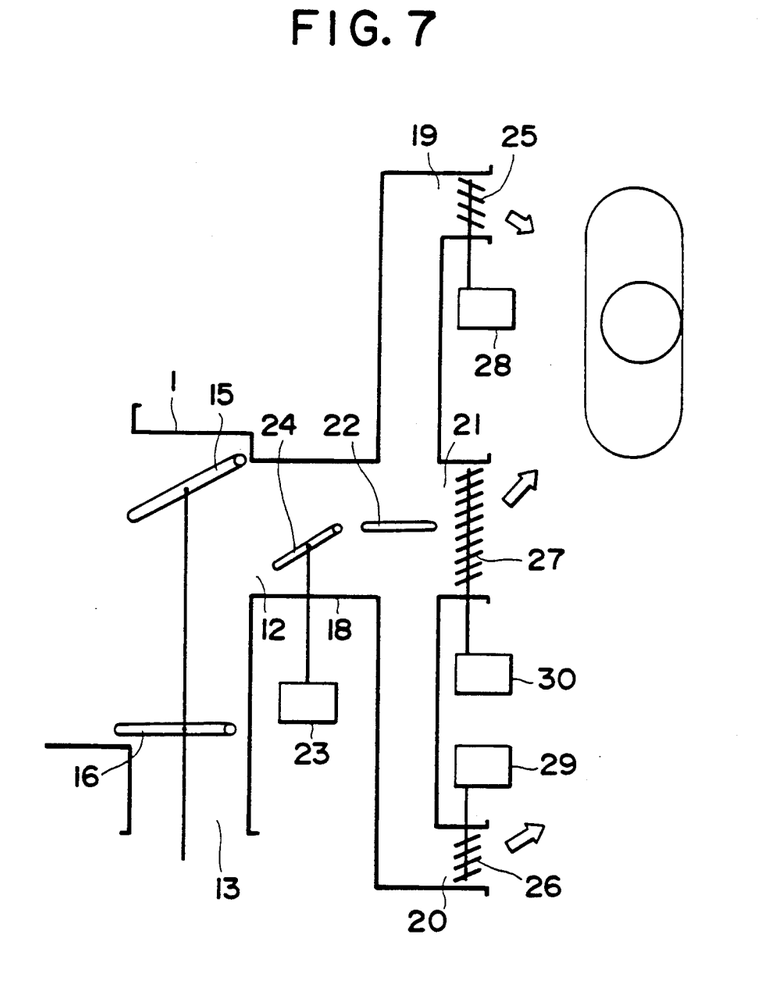
FIG. 7 is a diagrammatical view illustrative of the manner in which an air-distribution door and louvers operate.

As shown in FIG. 7, when the solar radiating direction is greater than +30°, for instance (this condition is referred to as "deviated solar radiation"), the louvers 25, 27 are so tilted as to direct conditioned air toward the driver as indicated by the arrows. In this instance, the louver 27 in the central upper outlet 21 is directed toward the driver. However, it is possible to direct the louver 27 toward the passenger. When the solar radiating direction is deviated from the right, then the louver 27 is tilted rightward, while the louver 27 is tilted leftward when the solar radiating direction is deviated from the leftward.

The steps 84 and 86 control the air-distribution in the manual mode. When the manual air-distribution control is selected, the left-to-right air-distribution ratio is regulated by the position of the air-distribution control lever 51. When the air-distribution control lever 51 is located in the central position (indicated by the mark "0" in FIG. 2), the left-to-right air-distribution ratio is 1:1. In other cases, the left-to-right air-distribution ratio varies in direct proportion to the distance of movement of the air-distribution control lever 51. In this instance, operation of louvers 25-27 is not controlled depending upon the solar radiating direction value $T_{SD}$ but they are operated in a periodical swing control mode.

Obviously, various minor changes and modifications of the present invention are possible in the light of the above teaching. It is therefore to be understood that within the scope of the appended claims the invention may be practiced otherwise than as specifically described.

What is claimed is:

1. An air-conditioner for an automobile, comprising:
   (a) solar radiation quantity detecting means for detecting a quantity of solar radiation at the right side of a passenger compartment of the automobile and a quantity of solar radiation at the left side of the passenger compartment;
   (b) solar radiating direction calculating means for calculating a solar radiating direction based on a solar radiation quantity signal detected by the solar radiation quantity detecting means;
   (c) air-distribution control means for determining proportions of air to be distributed to the left side of the passenger compartment and air to be distributed to the right side of the passenger compartment according to the solar radiating direction calculated by the solar radiating direction calculating means;
   (d) an air-distribution door operable under the control of the proportions of air determined by the air-distribution control means;
   (e) a plurality of louvers disposed, respectively, at a plurality of upper air outlets facing to the passenger compartment, the louvers being capable of swinging to set the direction air-discharged from the respective upper air outlets; and
   (f) louver control mean for controlling the direction of louvers so that said louvers are directed straight when an angle of deviation of the solar radiation direction relative to the direction of travel of the automobile is within a predetermined angle, and when said angle of deviation exceeds said predetermined angle, said louvers are tilted toward an occupant of the automobile.

2. An air-conditioner according to claim 1, wherein said solar radiation quantity detecting means comprises a pair of solar radiation sensors disposed on two opposite oblique surfaces of a sensor base, said oblique surfaces facing to the left and right, respectively, of the automobile, said sensor base being tilted toward the direction of travel of the automobile at a predetermined angle.

3. An air-conditioner according to claim 1, wherein said solar radiation quantity is a largest one of said left side solar radiation quantity, said right side solar radiation quantity, and the sum of said left and right solar radiation quantities whole divided by a predetermined value.

4. An air-conditioner according to claim 1, wherein said solar radiating direction is calculated by subtracting from a larger one of said left side solar radiation quantity and said right side solar radiation quantity minus a smaller solar radiation quantity whole divided by a predetermined value.

5. An air-conditioner according to claim 1, wherein said proportions of air to be distributed to the left side and air to be distributed to the right side is 1:1 when an angle of deviation of the solar radiation direction relative to the direction of travel of the automobile is within a predetermined range, and when said deviation angle exceeds said predetermined range in one direction, a quantity of air to be distributed to the same direction is increased, while at the same time a quantity of air to be distributed to the opposite direction is reduced correspondingly.

* * * * *